United States Patent [19]

Kamegawa

[11] Patent Number: 5,248,332
[45] Date of Patent: Sep. 28, 1993

[54] PASTELS CONTAINING PEARL PIGMENTS AND METHOD FOR PRODUCING THE SAME

[75] Inventor: Manabu Kamegawa, Osaka, Japan

[73] Assignee: Nouvel Laboratory, Ltd., Osaka, Japan

[21] Appl. No.: 756,225

[22] Filed: Sep. 5, 1991

[30] Foreign Application Priority Data

Sep. 5, 1990 [JP] Japan .................. 2-236117

[51] Int. Cl.$^5$ ................ C09D 13/00; C04B 14/20
[52] U.S. Cl. ................ 106/19 B; 106/415; 106/416; 106/417
[58] Field of Search ........... 106/19, 415, 416, 417

[56] References Cited

U.S. PATENT DOCUMENTS 4,768,987  9/1988  Usui et al. .............................. 106/19

FOREIGN PATENT DOCUMENTS

| | | | |
|---|---|---|---|
| 3120241 | 12/1982 | Fed. Rep. of Germany | 106/19 |
| 58-134166 | 8/1983 | Japan | 106/19 |
| 61-023667 | 2/1986 | Japan | 106/19 |
| 62-177081 | 8/1987 | Japan | 106/19 |
| 62-201982 | 9/1987 | Japan | 106/19 |

OTHER PUBLICATIONS

Derwent Abstract 87-254717/36 of JP 62-177081, Aug. 1987.

*Primary Examiner*—Mark L. Bell
*Assistant Examiner*—Scott L. Hertzog
*Attorney, Agent, or Firm*—Wegner, Cantor, Mueller & Player

[57] ABSTRACT

There is disclosed a method for producing a pastel containing a pearl pigment therein by extrusion molding. The method comprises preparing a molding material composed of a mixture comprising a pearl pigment in an amount of 30–93% by weight, a coloring pigment in an amount of 0–16% by weight, a first extender selected from bentonite and montmorillonite in an amount of 7–47% by weight, and a second extender other than the first in an amount of 0–13% by weight, and water in an amount sufficient to render the molding material plastic and moldable, and extrusion-molding and drying the material.

10 Claims, No Drawings

PASTELS CONTAINING PEARL PIGMENTS AND METHOD FOR PRODUCING THE SAME

FIELD OF THE INVENTION

This invention relates to a pastel containing pearl pigments and a method for producing the same.

DESCRIPTION OF THE PRIOR ART

A pastel is a stick-like drawing material having a square section and is very similar to conte (registered trade mark owned by Conte, France). A pastel is composed of almost pure pigments and a small amount of extender such as clay or kaolin, so that it provides drawings having a bright color tone of a peculiar sort derived from powder pigments, unlike oil colors or water colors.

In addition, a pastel has a large degree of freedom in drawing expression. For example, it can draw fine lines with its corner, and it can also draw with its surface. Thus, pastels have been known as an indispensable drawing material for sketching. In recent years, a pastel is widely used as a general drawing or painting material on account of its diversity of expressive power.

As such a drawing material, it is necessary that pastels be manufactured with many kinds of colors, and accordingly pastels have hitherto been usually produced by extrusion molding because of high efficiency and easiness of color change in manufacturing pastels. Moreover, pastels having a different size or shape can be readily produced by extrusion molding by exchanging a nozzle through which pastels are extruded.

A pastel containing pearl pigments is already known as one having a further new expressive power. However, there has been known no method of producing a pastel containing pearl pigments therein by extrusion molding, although it has been desired.

The conventional pastel containing normal pigments (other than pearl pigments) contains about 60-80% by weight of extender. However, pearl pigments are scaly so that it is necessary to use a larger amount of extender in order to extrude a material or a mixture containing such scaly pearl pigments. Meanwhile, a pastel containing such a large amount of extender provides no drawing having a pearly luster.

DESCRIPTION OF THE INVENTION

It is therefore an object of the invention to provide a pastel containing pearl pigments therein and a method of producing such a pastel by extrusion molding.

According to the invention there is provided a pastel which comprises a pearl pigment in an amount of 30-93% by weight, a coloring pigment in an amount of 0-16% by weight, a first extender selected from bentonite and montmorillonite in an amount of 7-47% by weight, and a second extender other than the first in an amount of 0-13% by weight.

Further according to the invention there is provided a method of producing such a pastel which comprises preparing a molding material composed of a mixture comprising a pearl pigment in an amount of 30-93% by weight, a coloring pigment in an amount of 0-16% by weight, the first extender in an amount of 7-47% by weight and the second extender in an amount of 0-13% by weight based on the mixture, and water in an amount sufficient to render the molding material plastic and moldable, and extrusion-molding and drying the material.

The method of the invention employs bentonite or montmorillonite as an extender so that the resultant molding material has a high plasticity or moldability notwithstanding a significant amount of pearl pigment contained therein, and thus the molding material can be readily extrusion-molded. The green mold thus obtained is cut to a suitable length and dried to provide a pastel containing a pearl pigment.

Three kind of pearl pigments are known, natural, synthetic and semisynthetic, as well known. In the invention, a semisynthetic pearl pigment which is mica having an oxide of metals coated thereon is preferred, although not limited thereto. Such a pearl pigment may include, for example, titanium dioxide-coated mica, its colored products and ferric oxide-coated mica. The pearl pigment used in the invention preferably has a particle size of 10-150 $\mu$m, more preferably 10-80 $\mu$m.

The mixture (to be mixed with water to provide the molding material as above set forth) contains a pearl pigment in an amount of 30-93% by weight, preferably 40-85% by weight. When the mixture contains a pearl pigment in an amount more than 93% by weight, the resultant molding material is short of viscosity or plasticity so that it is difficult to extrusion-mold the material. However, when the mixture contains a pearl pigment in an amount less than 30% by weight, the resultant pastel provides drawings having insufficient pearly luster.

When the mixture contains no coloring pigment, a white color pastel is obtained, whereas when the mixture contains a coloring pigment, a color pastel is obtained. As the coloring pigment, a variety of organic or inorganic pigments may be used as desired, from the standpoint of weather resistance. A pigment having high transparency as well as weather resistance is particularly preferred. A metal powder pigment or a dye may also be used if desirable.

The coloring pigment is used in an amount of not more than 16% by weight, preferably not more than 10% by weight, based on the mixture. The use of coloring pigment in an amount of more than 16% by weight based on the mixture provides a pastel which forms no drawing having a pearly luster. As a further disadvantage, when an organic pigment is used in a large amount as above, the resultant pastel is poorly drawable on paper.

According to the invention, the mixture contains a first extender selected from bentonite and montmorillonite. Bentonite is a kind of natural clay mainly composed of montmorillonite, and montmorillonite is a kind of clay minerals.

More specifically, clay or clay mineral having a large degree of swelling is preferred. The degree of swelling is measured as follows in accordance with The Japanese Pharmacopoeia Dispensatory, 9th Ed. An amount of 2.0 g of sample is added in ten times to 100 ml of water in a 100 ml capacitor measuring cylinder in such a manner that a portion of the sample is added to water and after the portion is substantially deposited, the next portion is added to water. After standing 24 hours, the apparent volume of the sample deposited on the bottom of the cylinder is measured in terms of the height from the bottom of the cylinder.

There may be mentioned as such a clay or clay minerals, for example, calcium bentonite having a degree of swelling of 3-7 ml/2 g, sodium bentonite having a degree of swelling of 10–30 ml/2 g, or sodium montmorillonite having a degree of swelling of 40–70 ml/2 g, with sodium montmorillonite being most preferred since it has a large degree of swelling, and also a degree of whiteness. These clay or clay minerals are commercially available.

According to the invention, the mixture contains such a first extender as above in an amount of 7–47% by weight, preferably 15–40% by weight so that the mixture can be formed into a plastic and extrusion-moldable material in spite of the fact that the mixture contains pearl pigments in an amount as large as 30–93% by weight. However, the use of the first extender in excess is not desirable since the resultant molding material provides a mold having creases on the surface, and it also fails to provide drawing having pearly luster.

A second extender may be used together with the first extender. The second extender is not specifically limited, but any conventional extender known in the art of production of pastels may be used. Thus, such a second extender includes, for example, clay, kaolin, talc, barium sulfate or calcium carbonate, and among these is preferred clay or kaolin. The second extender prevents the generation of creases on the surface of the resultant mold when a molding material is extrusion-molded. The second extender is used in an amount of not more than 13% by weight, preferably not more than 10% by weight, based on the mixture. When the second extender is used in excess, the resultant pastel provides no drawing having pearly luster.

It is most preferred that the mixture is composed of 45–80% by weight of a pearl pigment, 0–10% by weight of a coloring pigment, 18–35% by weight of bentonite or montmorillonite as the first extender and 0–10% by weight of the second extender.

The mixture is kneaded together with water to provide a highly plastic molding material. Thus, the material is extrusion-molded, cut to a suitable length, and dried to provide pastels. In the preparation of molding material, it is preferred that water is used in an amount of 50–120 parts by weight, preferably 60–110 parts by weight, in relation to 100 parts by weight of the mixture, however, the amount of water used is not limited to the above.

After the extrusion molding and cutting to a suitable length, the resultant green mold is dried usually at low temperatures, preferably at 30°–60° C., most preferably 40°–50° C., over a period of 10–48 hours so that the mold contains substantially no water. As apparent, the pastel of the invention has substantially the same composition as the mixture used for the preparation of molding material.

As above set forth, the use of bentonite or montmorillonite in a relatively small amount as an extender according to the invention provides a molding material with high plasticity notwithstanding a significant amount of pearl pigment contained therein. Accordingly pastels can be produced by extrusion molding. The resultant pastel contains a relatively small amount of extender so that it provides drawing having strong pearly luster.

The invention will now be described with reference to examples, however, the invention is not limited thereto.

EXAMPLES

In the examples, solid components (amount of each of which is indicated by % by weight) were mixed together with a kneader for 15 minutes. Then, water (amount of which is indicated in parentheses by parts by weight in relation to 100 parts by weight of the mixture, and which contains an appropriate amount of antiseptic) was added to the mixture and kneaded together for about one hour to prepare a molding material. The material was then extrusion-molded with an extruder, cut to a suitable length, and dried at 40° C. for 24 hours to provide pastels.

EXAMPLE 1

White Color Pearl Pastel

| | |
|---|---|
| Iriodin 100 Silver Pearl[1)] | 75.0 |
| Osmos N[2)] | 19.0 |
| Clay (having an oil absorption of 50–57 ml/100 g) | 5.4 |
| Water | (78.6) |

EXAMPLE 2

Pastel Having Silvery Pearly Luster

| | |
|---|---|
| Iriodin 100 Silver Pearl | 66.1 |
| Osmos N | 28.0 |
| Clay (having an oil absorption of 50–57 ml/100 g) | 5.4 |
| Carbon black | 0.5 |
| Water | (78.6) |

EXAMPLE 3

Pastel Having Bluish Pearly Luster

| | |
|---|---|
| Teika Pearl TP-690[3)] | 70.1 |
| Kunipia-F[4)] | 17.5 |
| Kaolin (having an oil absorption of 50–55 ml/100 g) | 6.1 |
| Ultramarine | 6.3 |
| Water | (75.1) |

EXAMPLE 4

Pastel Having Orange Pearly Luster

| | |
|---|---|
| Iriodine 150 Silver Pearl[5)] | 69.4 |
| Osmos N | 29.3 |
| Permanent Orange RL-70[6)] | 1.3 |
| Water | (82.8) |

This pastel was found to have some creases on the surface.

EXAMPLE 5

Pastel Having Brownish Pearly Luster

| | |
|---|---|
| Teika Pearl TP-900[7)] | 63.4 |
| Bentonite (having a degree of swelling of 16 ml/2 g) | 26.9 |
| Red oxide of iron | 9.7 |
| Water | (73.6) |

Since bentonite is slightly colored originally, there was used as a coloring pigment, red oxide of iron which is opaque and has large hiding power in a relatively large amount. Consequently, the resultant pastel was found to provide drawing having a little reduced pearly luster.

EXAMPLE 6

Pastel Having Reddish Pearly Luster

| Iriodin 100 Silver Pearl | 64.0 |
| --- | --- |
| Kunipia-F | 18.0 |
| Clay (having an oil absorption of 50-57 ml/100 g) | 10.0 |
| Eosin | 8.0 |
| Water | (100.0) |

For the preparation of molding material, the solid components except a dye were mixed together, and a solution of dye in water was added to the mixture and kneaded together.

NOTES:
1) Pearl pigment available from E. Merck, particle size of 10-60 μm.
2) Sodium montmorillonite available from Shiraishi Calcium K.K., having a degree of swelling of 50 ml/2 g.
3) Pearl pigment available from Teikoku Kako K.K., particle size of 15 μm.
4) Sodium montmorillonite available from Kunimine Koka Kogyo K.K., having a degree of swelling of 60 ml/2 g.
5) Pearl pigment available from E. Merck, particle size of 5-100 μm.
6) C.I. 21115 available from Hoechst.
7) Pearl pigment available from Teikoku Kako K.K., particle size of 60 μm.

What is claimed is:

1. A pastel consisting essentially of a pearl pigment in an amount of 30-93% by weight, a coloring pigment in an amount of 0-16% by weight, a first extender selected from bentonite and montmorillonite in an amount of 7-47% by weight, and a second extender other than the first in an amount of 0-13% by weight.

2. The pastel as claimed in claim 1 wherein the montmorillonite is sodium montmorillonite.

3. The pastel as claimed in claim 1 wherein the second extender is clay or kaolin.

4. The pastel as claimed in claim 1 which consists essentially of 45-80% by weight of a pearl pigment, 0-10% by weight of a coloring pigment, 18-35% by weight of bentonite or montmorillonite as the first extender and 0-10% by weight of the second extender.

5. A method of producing a pastel comprising the steps of:
preparing a molding material consisting essentially of a mixture, said mixture consisting essentially of a pearl pigment in an amount of 30-93% by weight, a coloring pigment in an amount of 0-16% by weight, a first extender selected from bentonite and montmorillonite in an amount of 7-47% by weight, and a second extender other than the first in an amount of 0-13% by weight, and water in an amount sufficient to render the molding material plastic and moldable,
extrusion-molding the molding material, and
drying the molding material.

6. The method as claimed in claim 5 wherein the montmorillonite is sodium montmorillonite.

7. The method as claimed in claim 5 wherein the second extender is clay or kaolin.

8. The method as claimed in claim 5 wherein the mixture consists essentially of 45-80% by weight of a pearl pigment, 0-10% by weight of a coloring pigment, 18-35% by weight of bentonite or montmorillonite as the first extender and 0-10% by weight of the second extender.

9. The method as claimed in claim 5 wherein the water is used in an amount of 50-120 parts by weight in relation to 100 parts by weight of the mixture.

10. The method as claimed in claim 5 wherein the molding material is extrusion-molded, cut to a suitable length and dried at 30°-60° C.

* * * * *